March 31, 1953 R. SCHOSTAL 2,633,377
PARKING VIEWER FOR AUTOMOBILES
Filed Nov. 13, 1950 3 Sheets-Sheet 1
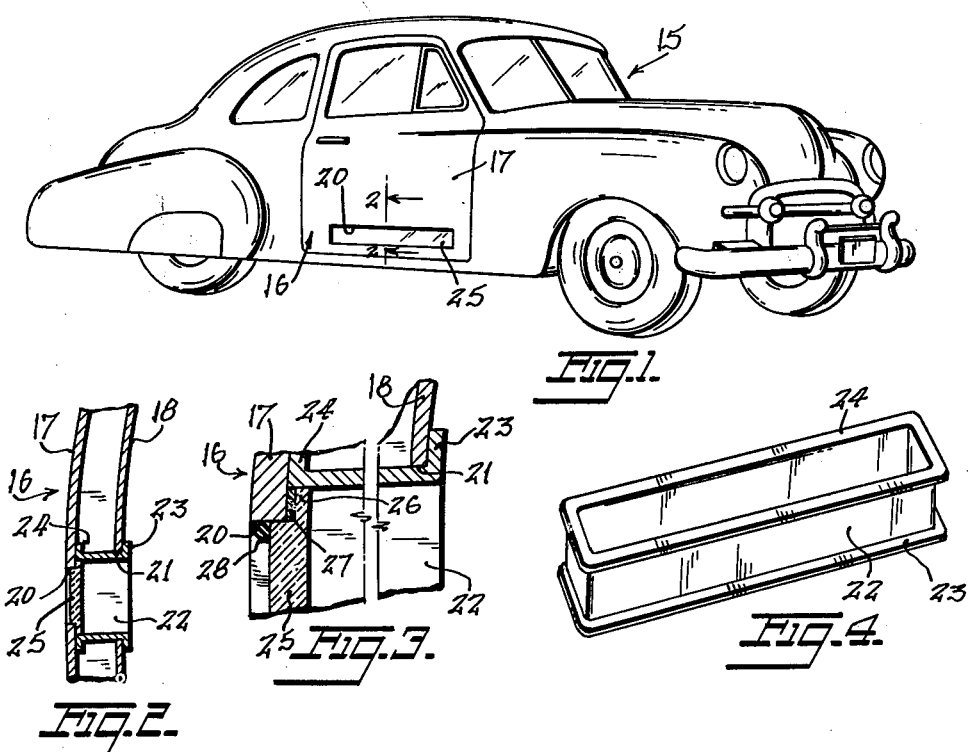
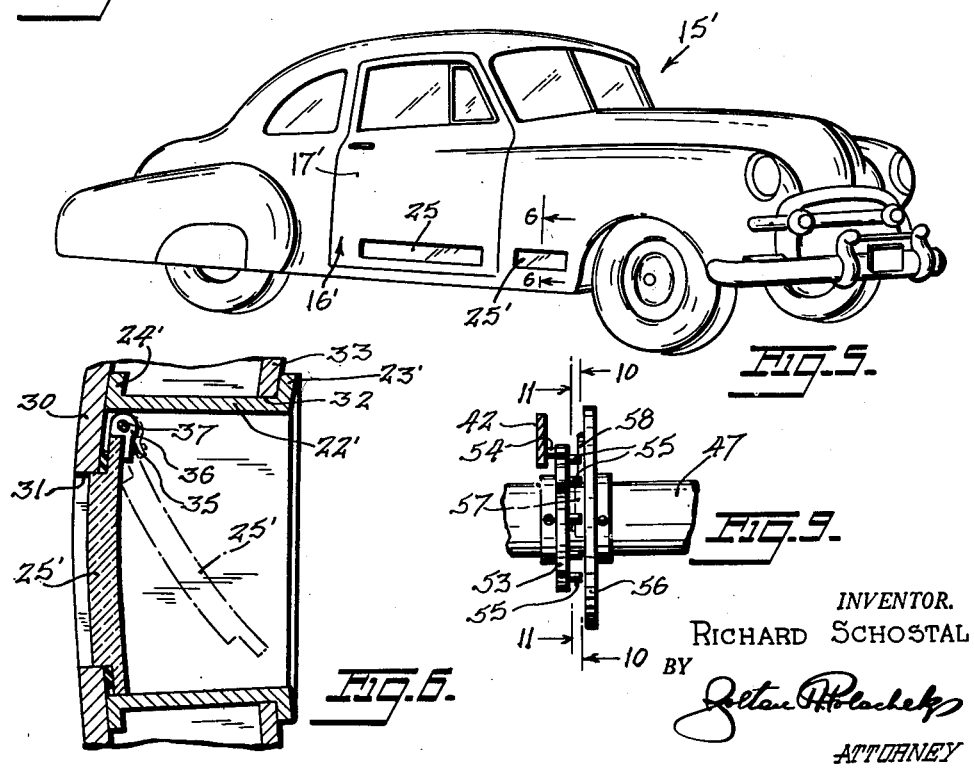
INVENTOR.
RICHARD SCHOSTAL
BY
ATTORNEY

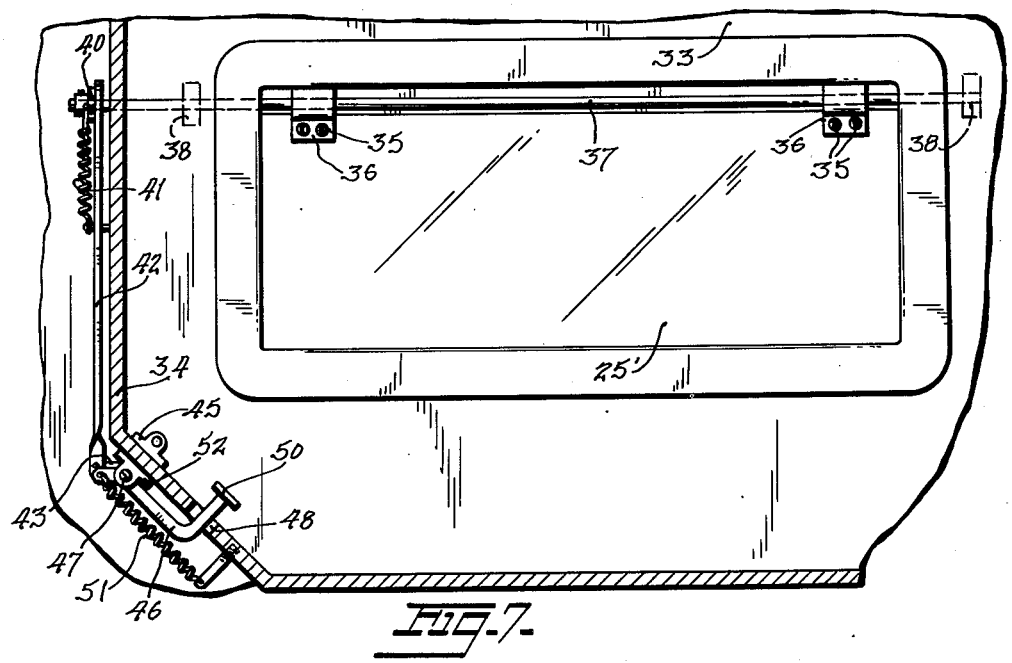

March 31, 1953        R. SCHOSTAL        2,633,377
PARKING VIEWER FOR AUTOMOBILES
Filed Nov. 13, 1950        3 Sheets-Sheet 3
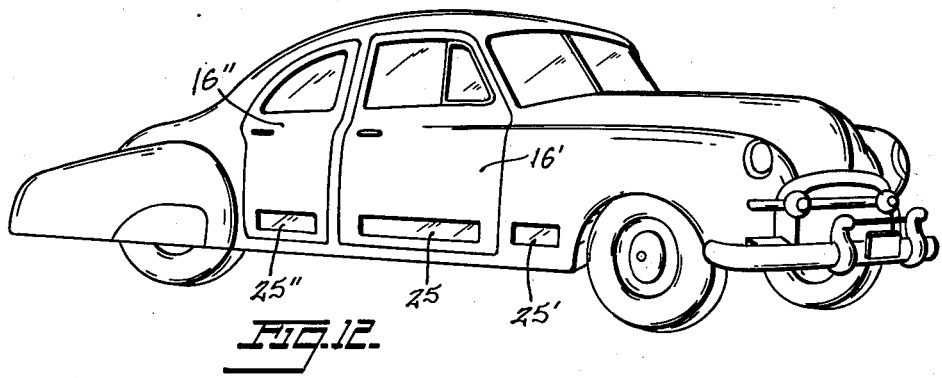
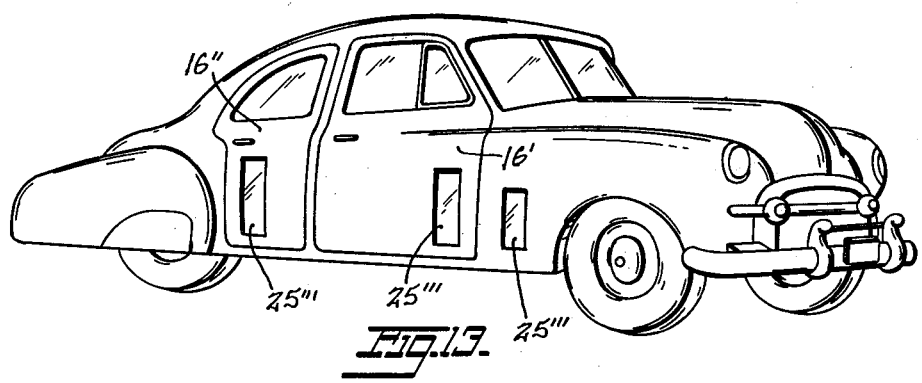
INVENTOR.
RICHARD SCHOSTAL
BY
ATTORNEY Patented Mar. 31, 1953

2,633,377

UNITED STATES PATENT OFFICE 2,633,377

PARKING VIEWER FOR AUTOMOBILES

Richard Schostal, New York, N. Y.

Application November 13, 1950, Serial No. 195,250

3 Claims. (Cl. 296—1)

This invention relates to new and useful improvements in motor vehicles and, more particularly, to means for facilitating the parking of a motor vehicle immediately adjacent a curbstone or the like.

The problem of parking a modern automobile within six inches of a curb is rendered extremely difficult by the inability of the driver to see the curb over the wide hood and fenders of the vehicle.

One object of the invention is the provision of means to enable the driver to see the curb against which he is attempting to park, whether it be on the right or the left side of the vehicle.

Another object of the invention is to construct said means in such manner that the same are utilizable to ventilate the vehicle.

Still another object of the invention is the provision of a single foot operated control for effecting ventilation by said means and for blocking such ventilation.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of an automobile having one form of the invention embodied therein.

Fig. 2 is a somewhat enlarged fragmentary sectional view on line 2—2 of Fig. 1.

Fig. 3 is an enlargement of a portion of Fig. 2.

Fig. 4 is a perspective view of an aperture member shown also in Figs. 2 and 3.

Fig. 5 is a perspective view of an automobile having a modified form of the invention embodied therein.

Fig. 6 is an enlarged fragmentary sectional view on line 6—6 of Fig. 5.

Fig. 7 is an enlarged fragmentary view from within, or the modified means of Figs. 5 and 6.

Fig. 8 is a fragmentary frontal view of the means of Fig. 7.

Fig. 9 is a fragmentary enlargement of a portion of the means shown in Fig. 8.

Fig. 10 is a sectional view on line 10—10 of Fig. 9.

Fig. 11 is a sectional view on line 11—11 of Fig. 9.

Fig. 12 is a similar view of Fig. 5 with a further modification embodied therein.

Fig. 13 is another view similar to Fig. 12 showing a further modification of the invention.

In the following description and in the drawings, the invention is depicted as applied to the right-hand side of an automobile, it being understood, however, that the same construction may apply also to the left-hand or driver's side thereof.

Referring now to Figs. 1-4 wherein a first form of the invention is illustrated, the reference numeral 15 indicates an automobile of conventional design and having a front door 16 on either side thereof. Each of the doors 16 is of standard construction and includes an outer metal sheet 17 and spaced therefrom an inner panel 18 of simulated leather or the like. According to the invention the sheet 17 is provided near its lower edge with a rectangularly shaped cutout 20, and the panel 18 is provided with a like shaped but higher cutout 21. The purpose of locating cutout 21 slightly higher than cutout 20 is to align the two when viewed from the height at which the driver's eyes are normally located.

A duct-like member 22 has at one end an edging flange 23 engaged over the lip of cutout 21 and at the other end an edging flange 24 secured to sheet 17 about the perimeter of cutout 20. The wall of member 22 is of course inclined in accordance with the degree of offsetting of the cutouts.

A window pane 25 of suitable transparent plastic material has a perimetral edge extension 26 of reduced thickness which is secured by cement 27 against the lip of cutout 20, the thicker main portion of said window pane extending into the cutout slightly. For further sealing, a bead 28 of rubber or the like is secured in the cutout 20 against the edge of the window pane 25.

The construction is such that all the driver of the automobile need do to ascertain the location of a curbstone with relation to his vehicle, is to glance through the window 25.

A modified form of the invention is illustrated in Figs. 5-11 wherein like parts are given the same reference numerals as hereinbefore with a prime added. In this form of the invention the front doors 16' may be provided with windows 25' as described above, or not, as desired. Forward of each front door of the automobile, however, the side panel 30 of the car is provided with a cutout 31 which, see Figs. 6 and 7, is aligned with but smaller than a cutout 32 in the inner wall 33 of the car just behind the vehicle's fire wall 34. A duct-like member 22' in all respects like that described above interconnects cutouts 31 and 32. The inner rim of cutout 32 is provided with a gasket or the like of rubber or other soft material against which the thin edge extension 26' of a window pane 25' abuts. The upper end of window 25' is, by screws 35 to a pair of hinges or arms 36, secured on a shaft 37. Suitable pivotal supports 38 are provided for the shaft 37 and the latter extends forward through the fire wall 34. Referring also to Figs. 8-11, the shaft 37 has secured thereon forward of the wall 34 an arm 40 which is acted upon by a spring 41 which normally holds the window 25' in the closed position of Fig. 6. The arm 40 is also connected by a depending link 42 with the free end of an arm 43 which extends through a slot 44 in the inclined lower portion of wall 34 and is pivoted in a pivot block 45 secured to the rear face of the wall. It will readily be seen that lifting of the link 42 by arm 43 will open window 25' to the dot-dash position of Fig. 6 to ventilate the car.

It is desired that a single control be provided both to open the window 25' and to close it. To this end a bell crank 46 is secured on a shaft 47 and has one arm projecting through a slot 48 in the inclined portion of wall 34 in position to be operated by the driver's foot. A pedal 50 preferably is secured atop the said bell crank arm. The other arm of the bell crank is acted on by a spring 51. The shaft 47 is journalled in suitable bearing blocks 52 and extends transversely across the wall 34. For each window 25' the shaft has loosely mounted thereon a cam 53 having four high dwells interspersed with four low dwells, all being equally spaced. A pin 54 projects from the arm 43 associated with each window 25' into engagement with the periphery of the associated cam 53. In obvious manner a high dwell of the cam 53 raises the link 42 and maintains the window 25' open, while a low dwell of the cam allows the spring 41 to maintain the window closed. The pedal arm of bell crank 46 is designed to rock the shaft 47 one-eighth turn at each operation thereof, and the following means are provided to rotate the cam 53 to disengage a low dwell from the pin 54 and engage a high dwell therewith, or vice versa, at each operation of said bell crank. Projecting laterally from the cam 53 are eight studs or pins 55, one located at the radial center of each dwell. Adjacent the cam 53 a disc 56 is secured on the shaft 47 and has pivoted to its side face a pawl 57 adapted to engage the pins 55 successively. A spring 58 normally holds the pawl 57 against a limit stud 60 in position to engage a pin 54 but is adapted to yield on occasion.

The construction is such that an operation of bell crank 46 rocks shaft 47 and disc 56 one-eighth turn. The pawl 57 being in engagement with one of the pins 55 rocks the cam 53 one-eighth turn effecting opening or closing of the window 25' as described above. As the pedal is released spring 51 rocks shaft 47 and disc 56 back to normal, the spring 58 yielding to allow pawl 57 to snap behind the next succeeding pin 55.

Thus not only is the window 25' useful in guiding the vehicle to the curb, but also is useful in ventilating the vehicle.

A left-hand window 25' and the means controlled by shaft 47 for operating, are not illustrated, inasmuch as they are identical duplicates of their right-hand counterparts which are shown.

In Fig. 12 the rear door 16'' is also shown with a window pane 25''.

In Fig. 13 the window panes 25''' are shown to be vertically arranged. In other respects this form of the invention is similar to the previous forms.

It is also to be mentioned that, if desired, the front doors of the vehicle could be made entirely of transparent plastic material to afford the desired lateral visibility.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In an automobile having inner and outer side panels forward of the front doors but behind the fire wall, the combination of cutouts in said outer and inner panels aligned with the line of sight of the driver of the automobile, a duct-like member bridging the space between said cutouts, a transparent plastic window closing the outer cutout, hinge means for said window, a shaft extending above said window between said panels and through said fire wall, arms on said shaft secured to the upper end of the window, an arm on said shaft forward of the fire wall, a spring acting on said arm to hold said window closed and means operated successively to allow said spring to act and to open said window, including a foot pedal convenient to the driver and spring urged to normal position, a shaft rotated a definite angular increment by an operation of said pedal, a cam loosely mounted on said shaft and having alternate high and low dwells spaced equally with said increment of rotation, a follower for said cam operatively connected with the said arm to open the window when engaged by a high dwell, and ratchet means for rotating said cam said angular increment at each operation of said pedal.

2. In an automobile having inner and outer side panels forward of the front doors but behind the fire wall, the combination of cutouts in said outer and inner panels aligned with the line of sight of the driver of the automobile, a duct-like member bridging the space between said cutouts, a transparent plastic window closing the outer cutout, hinge means for said window, a shaft extending above said window between said panels and through said fire wall, arms on said shaft secured to the upper end of the window, an arm on said shaft forward of the fire wall, a spring acting on said arm to hold said window closed and means operated successively to allow said spring to act and to open said window, including a foot pedal convenient to the driver and spring urged to normal position, a shaft rotated a definite angular increment by an operation of said pedal, a cam loosely mounted on said shaft and having alternate high and low dwells spaced equally with said increment of rotation, a follower for said cam operatively connected with the said arm to open the window when engaged by a high dwell, and ratchet means for rotating said cam said angular increment at each operation of said pedal, comprising pins projecting laterally from the cam, one at the center of each dwell, a disc secured on the shaft adjacent the cam, and a pawl pivoted to the disc and adapted to engage said pins successively.

3. The combination of claim 2 wherein said disc secures a spring, said spring engaging the pawl, a pin on said arm and a limit stud on said disc, said spring holding said pawl normally against the limit stud in position to engage said last named pin.

RICHARD SCHOSTAL.

REFERENCES CITED

The following references are of record in the file of this patent:

UNITED STATES PATENTS

| Number | Name | Date |
| --- | --- | --- |
| 1,218,645 | Gustafson | Mar. 13, 1917 |
| 1,492,710 | Justi, Jr. | May 6, 1924 |
| 1,857,705 | Wolff et al. | May 10, 1932 |
| 2,224,494 | White | Dec. 10, 1940 |
| 2,240,586 | Thompson | May 6, 1941 |
| 2,492,282 | Hanky | Dec. 27, 1949 |